US00RE45646E

(19) United States
(12) Reissued Patent
Ciungan et al.

(10) Patent Number: US RE45,646 E
(45) Date of Reissued Patent: Aug. 11, 2015

(54) MOUNT

(71) Applicant: Peerless Industries, Inc., Aurora, IL (US)

(72) Inventors: Marcel Ciungan, Arlington Heights, IL (US); Dugan O'Keene, Forest Park, IL (US)

(73) Assignee: Peerless Industries, Inc., Aurora, IL (US)

(21) Appl. No.: 29/469,200

(22) Filed: Oct. 8, 2013

Related U.S. Patent Documents

Reissue of:
(64) Patent No.: Des. 558,562
Issued: Jan. 1, 2008
Appl. No.: 29/264,330
Filed: Aug. 8, 2006

U.S. Applications:
(62) Division of application No. 29/335,520, filed on Apr. 16, 2009, now Pat. No. Re. 44,515, which is an application for the reissue of Pat. No. Des. 558,562.

(51) LOC (10) Cl. ..... 08-05
(52) U.S. Cl.
USPC ..... D8/363
(58) Field of Classification Search
USPC ..... D8/354, 363, 239; D14/451–452, 375, D14/433; 248/593, 586, 274.4, 284.1; 455/561; 343/878–892
See application file for complete search history.

(56) References Cited

U.S. PATENT DOCUMENTS 5,751,548 A * 5/1998 Hall et al. ..... 361/686
6,095,467 A * 8/2000 Neuhof ..... 248/278.1

(Continued)

OTHER PUBLICATIONS

"Installation and Assembly: Articulating LCD Wall Arm," Installation Instructions. Peerless Industries, Inc., Issued May 18, 2005.

*Primary Examiner* — Phillip S Hyder
(74) *Attorney, Agent, or Firm* — Foley & Lardner LLP

(57) CLAIM

We claim the ornamental design for [an articulating mount unit] *a mount*, as shown and described.

DESCRIPTION

Figure 1:
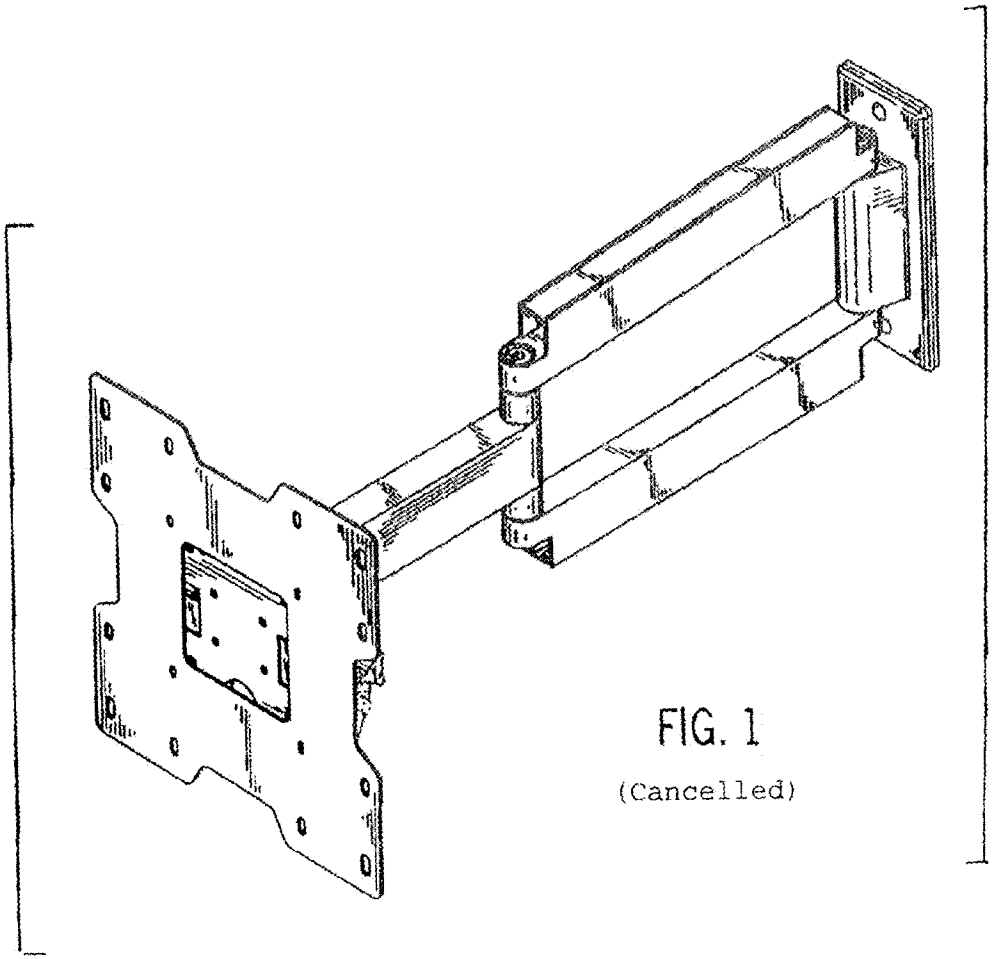
Figure 2:
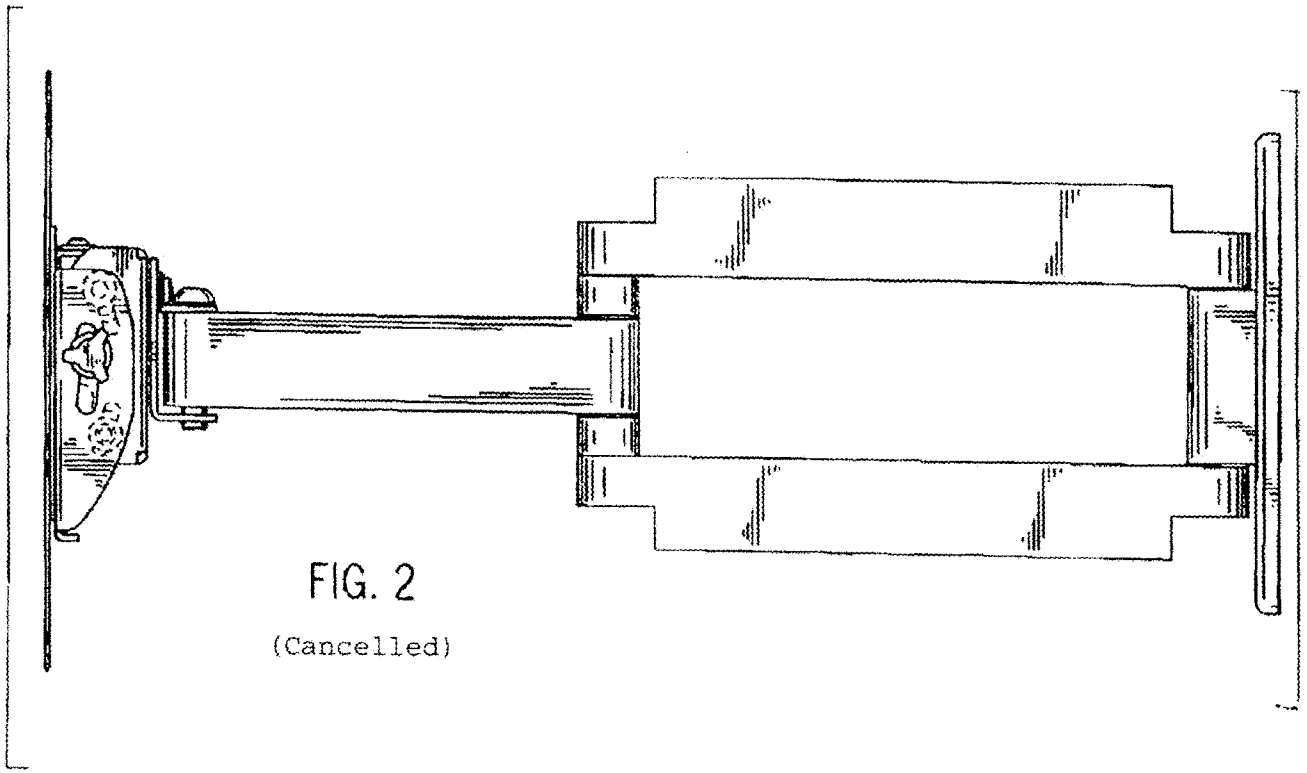
Figure 3:
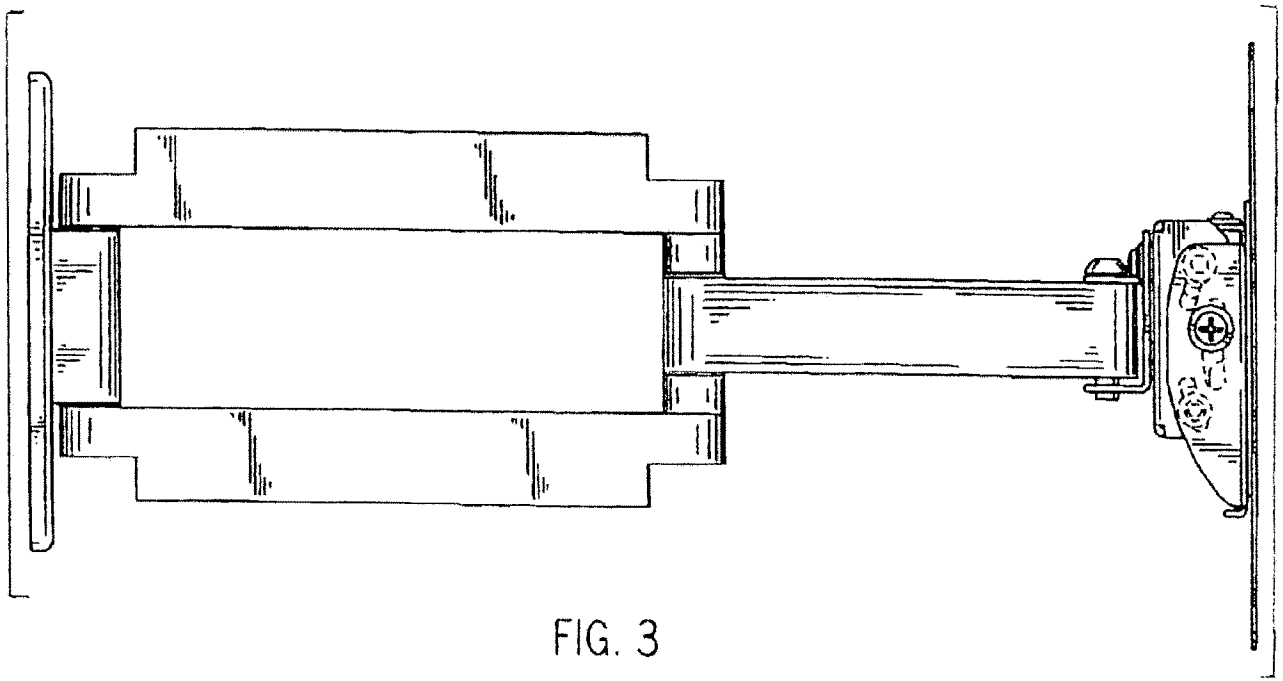
Figure 5:
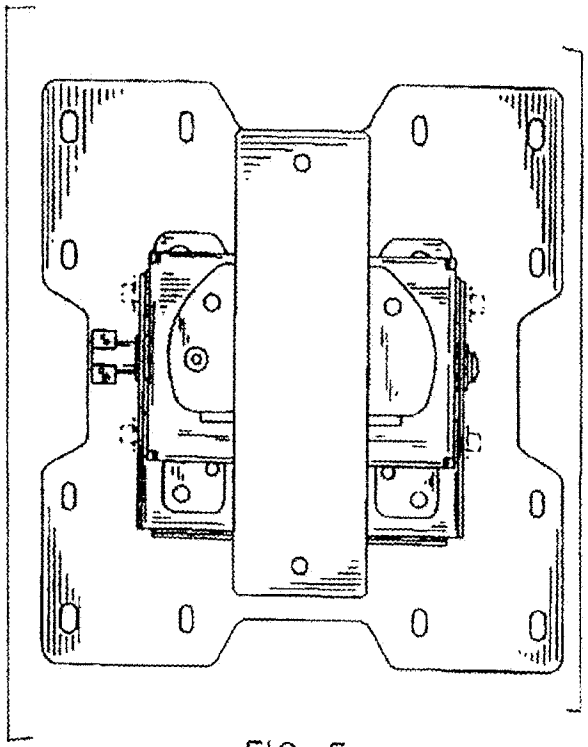
Figure 4:
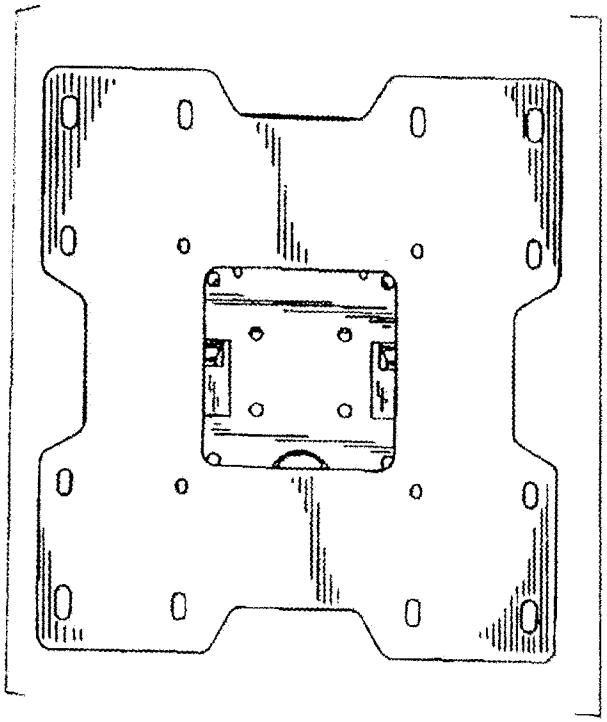
Figure 6:
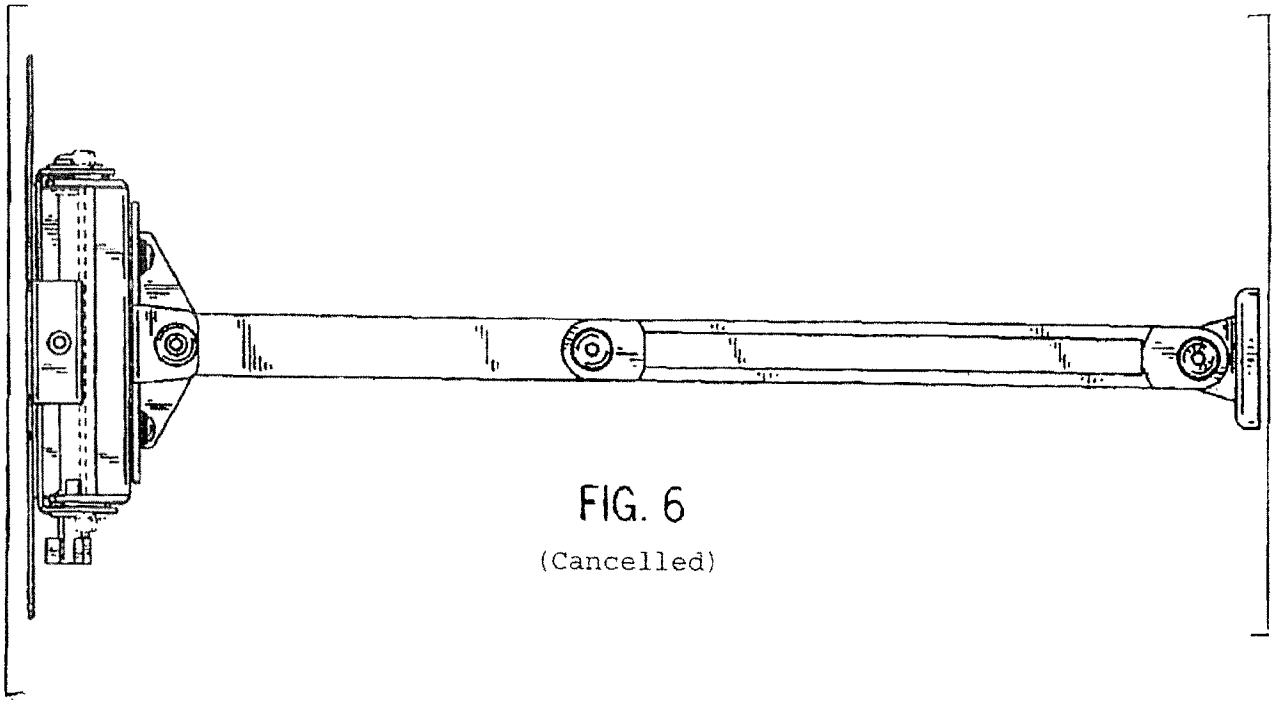
Figure 7:
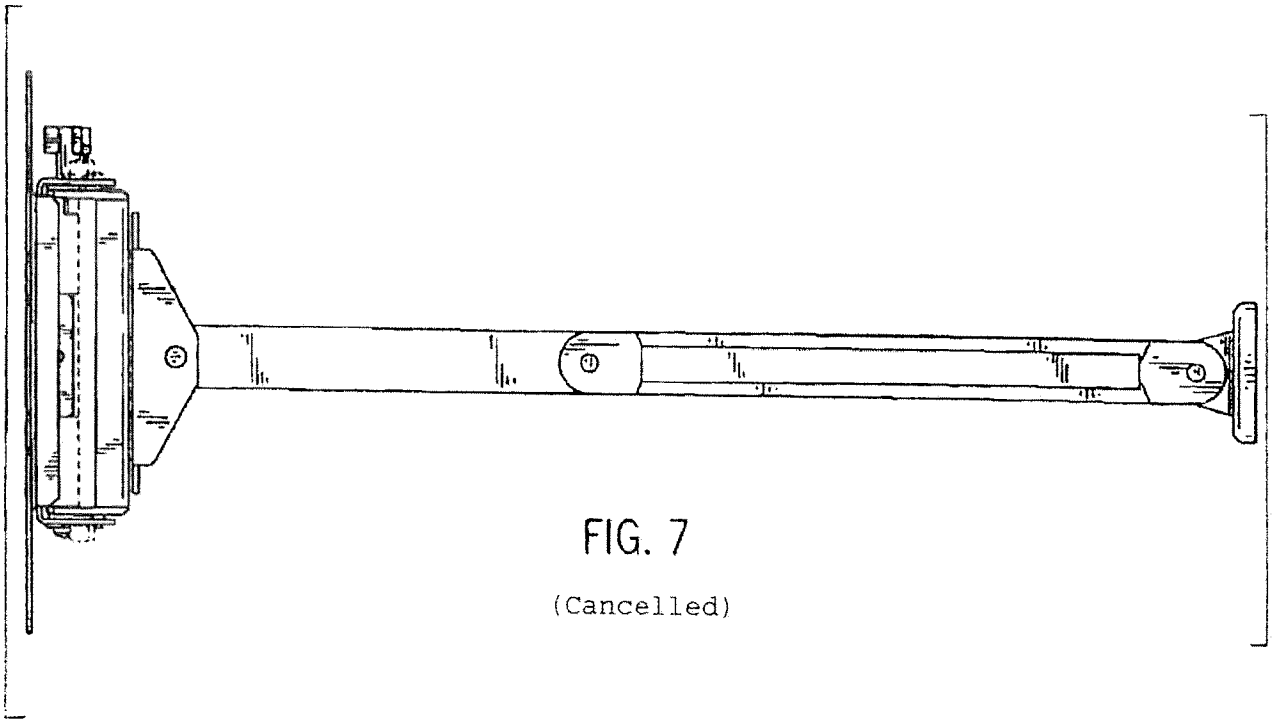
Figure 8:
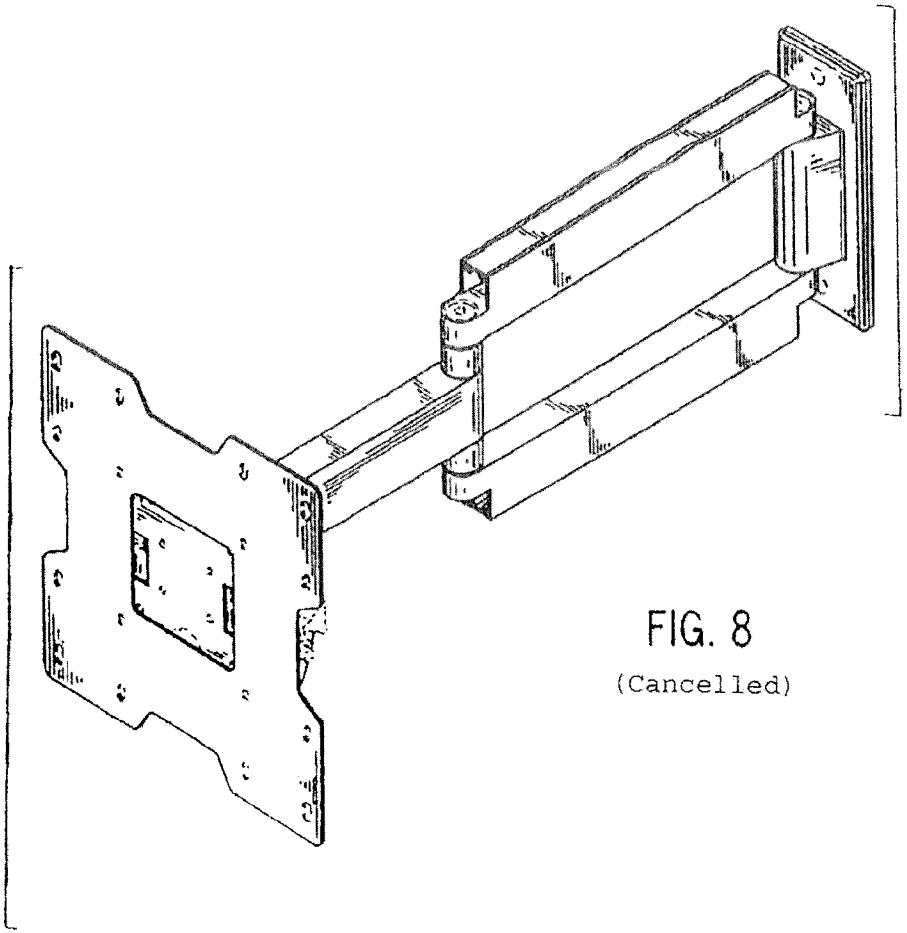
Figure 9:
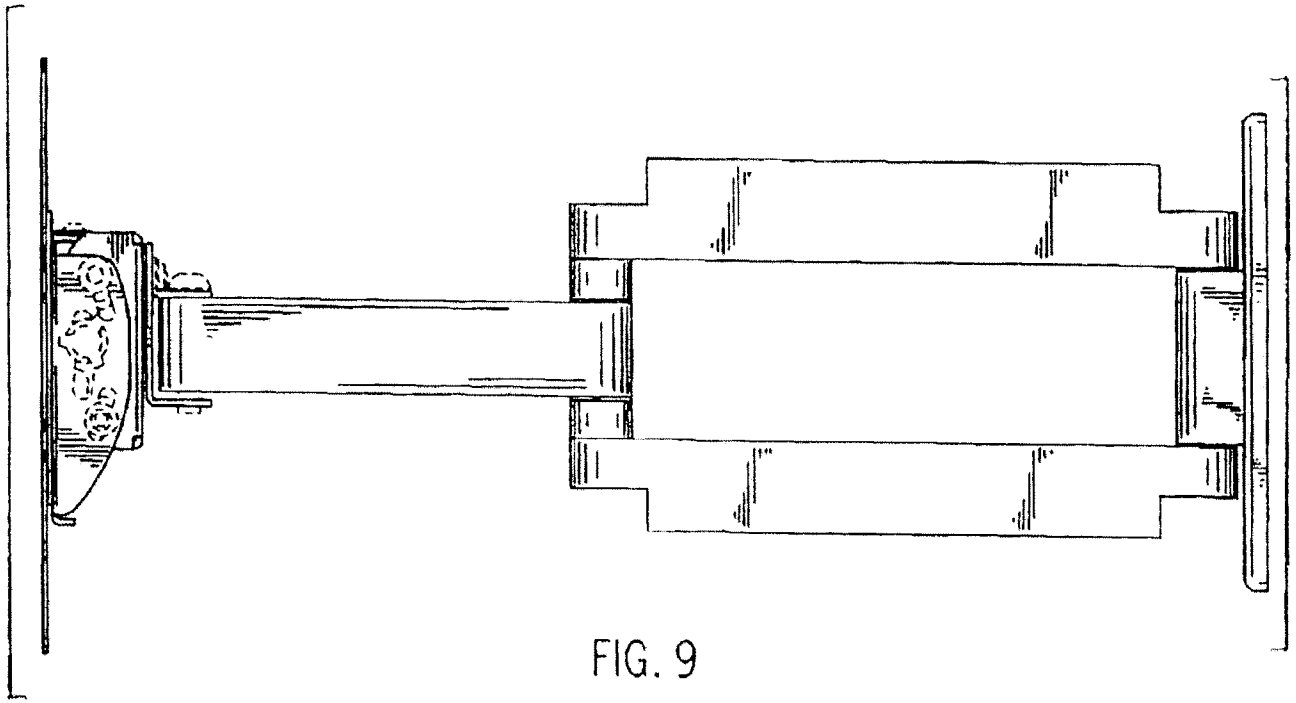
Figure 10:
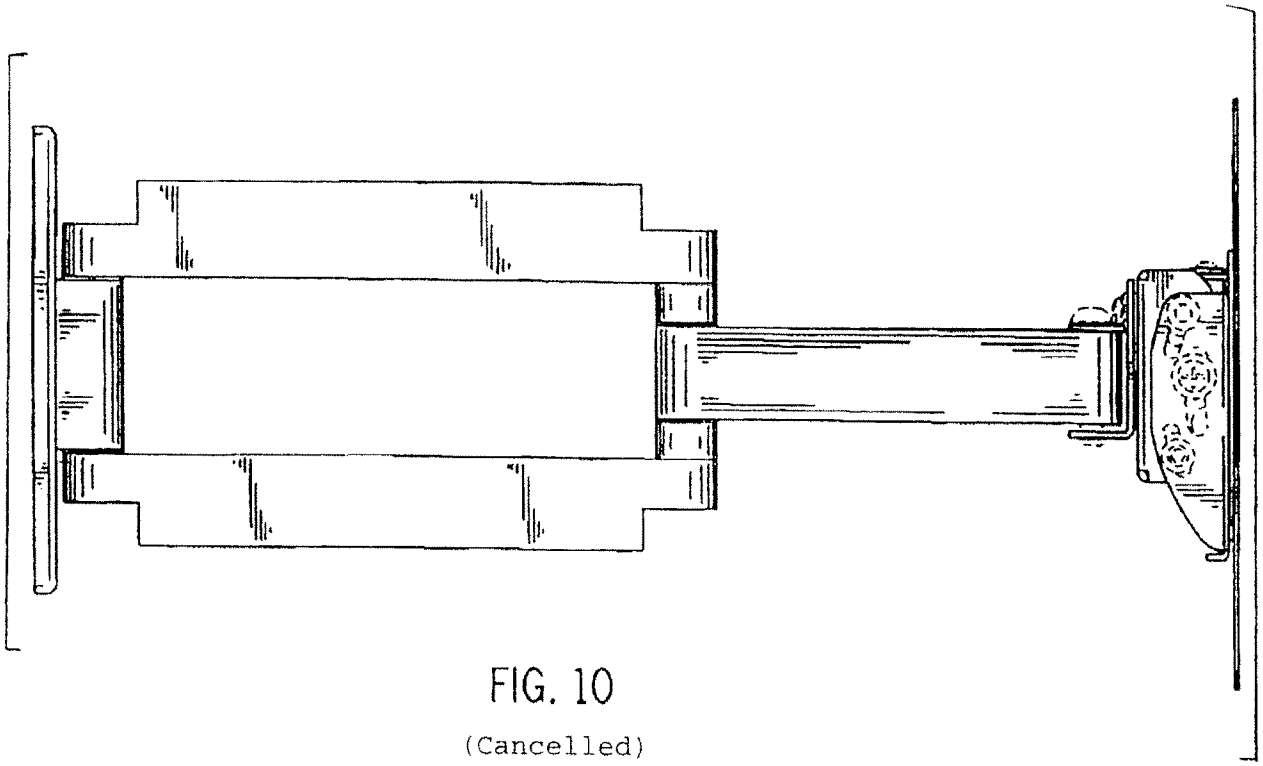
Figure 12:
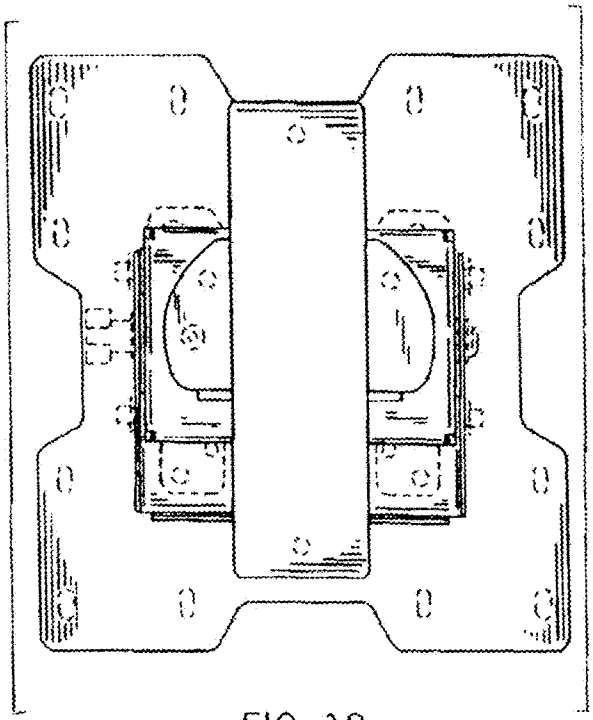
Figure 11:
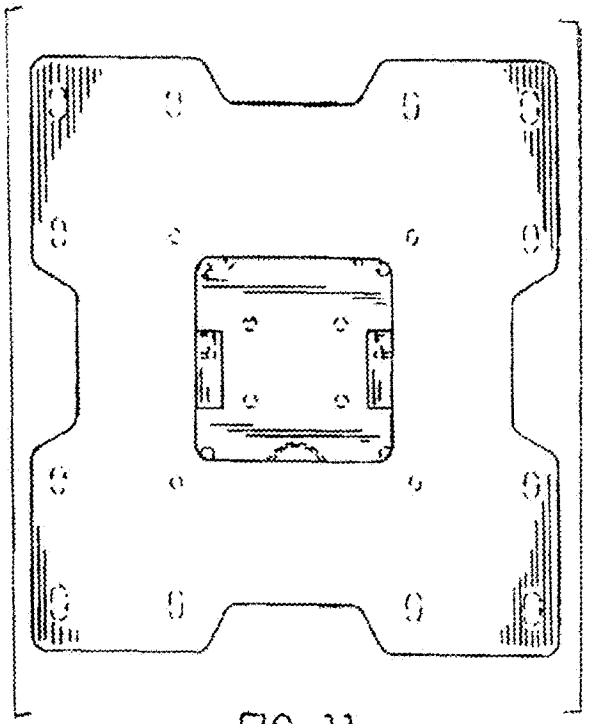
Figure 13:
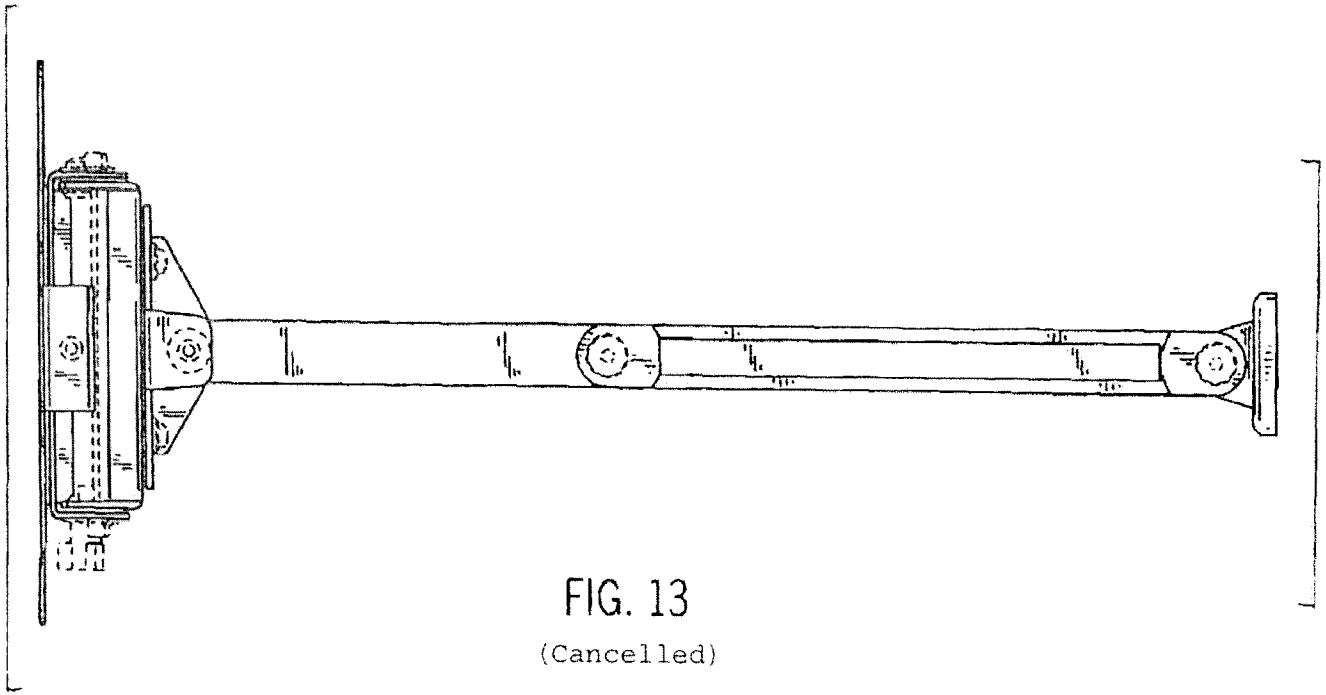
Figure 14:
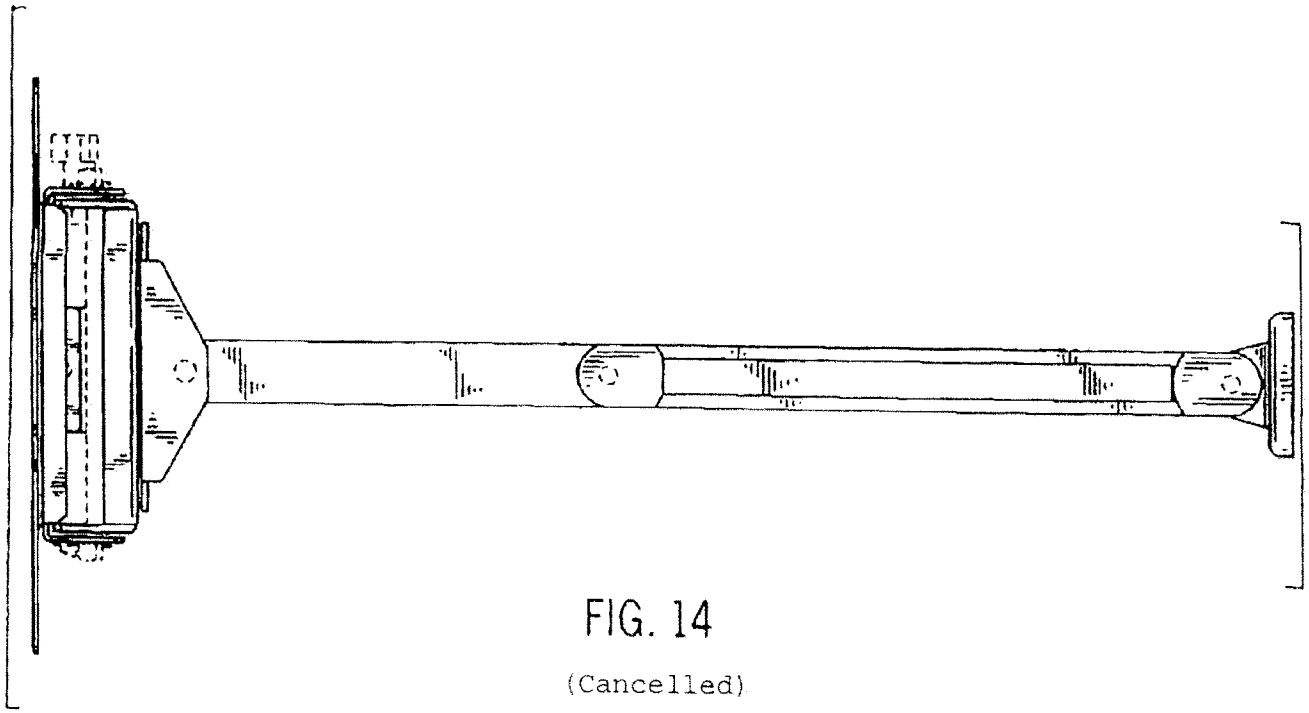

[FIG. 1 is a perspective view of the articulating mount unit showing our new design;]
[FIG. 2 is a left side view thereof;]
[FIG. 3 is a right side view thereof;]
[FIG. 4 is a front view thereof;]
[FIG. 5 is a rear view thereof;]
[FIG. 6 is a top plan view thereof;]
[FIG. 7 is a bottom view thereof;]
[FIG. 8 is a perspective view of another embodiment of the articulating mount unit showing our new design;]
[FIG. 9 is a left side view of the articulating mount unit in FIG. 8;]
[FIG. 10 is a right side view of the articulating mount unit in FIG. 8;]
[FIG. 11 is a front view of the articulating mount unit in FIG. 8;]
[FIG. 12 is rear view of the articulating mount unit in FIG. 8;]
[FIG. 13 is a top plan view of the articulating mount unit in FIG. 8; and,]
[FIG. 14 is a bottom view of the articulating mount unit in FIG. 8.]
*FIG. 15 is a perspective view of a mount showing our new design;*
*FIG. 16 is a front view thereof;*
*FIG. 17 is a rear view thereof;*
*FIG. 18 is a right side view thereof;*
*FIG. 19 is a left side view thereof;*
*FIG. 20 is a top plan view thereof; and,*
*FIG. 21 is a bottom plan view thereof.*
The broken lines in the drawings are for illustrative purposes only and form no part of the claimed design.

1 Claim, 16 Drawing Sheets

Matter enclosed in heavy brackets [ ] appears in the original patent but forms no part of this reissue; matter printed in italics indicates the additions made by reissue.

(56) References Cited

U.S. PATENT DOCUMENTS

| | | | | | |
|---|---|---|---|---|---|
| D455,949 | S | * | 4/2002 | Huang | D8/373 |
| 6,478,275 | B1 | * | 11/2002 | Huang | 248/284.1 |
| D472,793 | S | | 4/2003 | Callahan et al. | |
| 6,554,238 | B1 | * | 4/2003 | Hibberd | 248/278.1 |
| 6,695,270 | B1 | * | 2/2004 | Smed | 248/274.1 |
| D488,708 | S | | 4/2004 | Lam et al. | |
| D489,377 | S | * | 5/2004 | van Kuijk | D14/451 |
| D489,599 | S | | 5/2004 | Lam | |
| D494,978 | S | * | 8/2004 | Pfister | D14/451 |
| D495,713 | S | * | 9/2004 | Pfister et al. | D14/451 |
| D496,367 | S | | 9/2004 | Pfister | |
| D503,858 | S | | 4/2005 | Ricci | |
| 6,905,101 | B1 | | 6/2005 | Dittmer | |
| D507,477 | S | | 7/2005 | Pfister | |
| 7,028,961 | B1 | | 4/2006 | Dittmer et al. | |
| D538,633 | S | | 3/2007 | Ly Hau et al. | |
| D539,123 | S | | 3/2007 | Ly Hau et al. | |
| D543,548 | S | | 5/2007 | Muday et al. | |
| D558,560 | S | | 1/2008 | Ciungan | |
| D558,561 | S | | 1/2008 | Ciungan | |
| D558,563 | S | | 1/2008 | Ciungan | |
| D558,564 | S | | 1/2008 | Ciungan | |
| D559,085 | S | | 1/2008 | Ciungan | |
| D559,087 | S | | 1/2008 | Ciungan | |
| D559,088 | S | | 1/2008 | Ciungan | |
| D560,674 | S | | 1/2008 | Wohlford et al. | |
| D560,675 | S | * | 1/2008 | Wohlford et al. | D14/451 |
| D560,677 | S | * | 1/2008 | Wohlford et al. | D14/451 |
| D588,563 | S | | 3/2009 | Oh et al. | |
| 2004/0245420 | A1 | | 12/2004 | Pfister et al. | |
| 2005/0263659 | A1 | | 12/2005 | Pfister et al. | |
| 2005/0263671 | A1 | | 12/2005 | Lo | |

* cited by examiner (Cancelled)

(Cancelled)

(Cancelled)

(Cancelled)

(Cancelled)

(Cancelled)

(Cancelled)

(Cancelled)

(Cancelled)

(Cancelled)

(Cancelled)

(Cancelled)

(Cancelled)

(Cancelled)

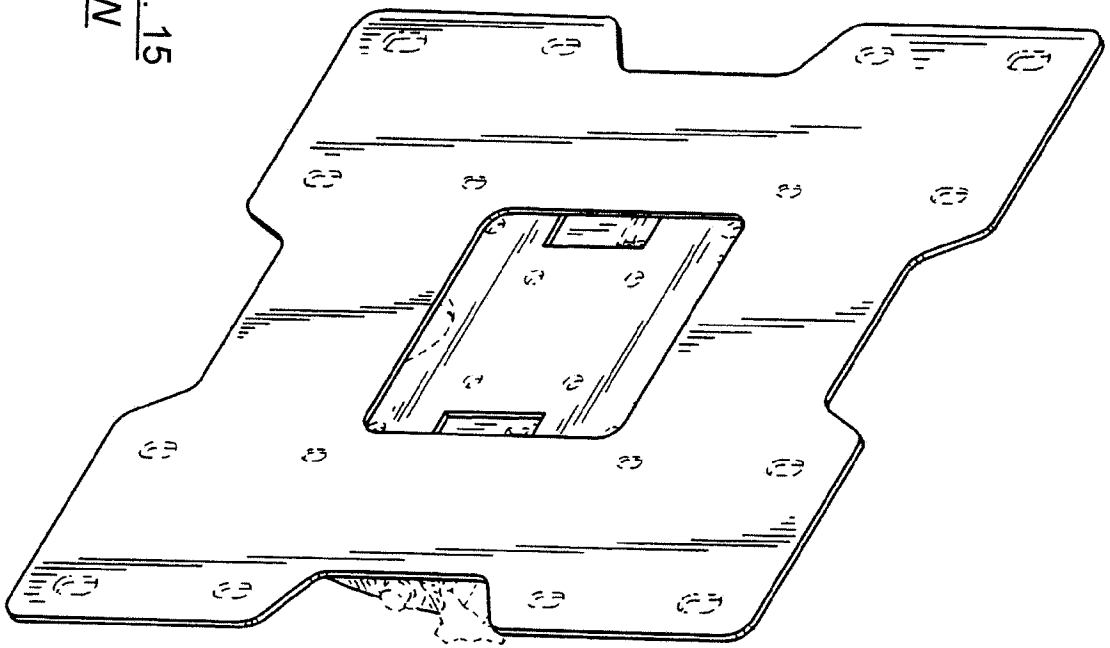
FIG. 15
NEW

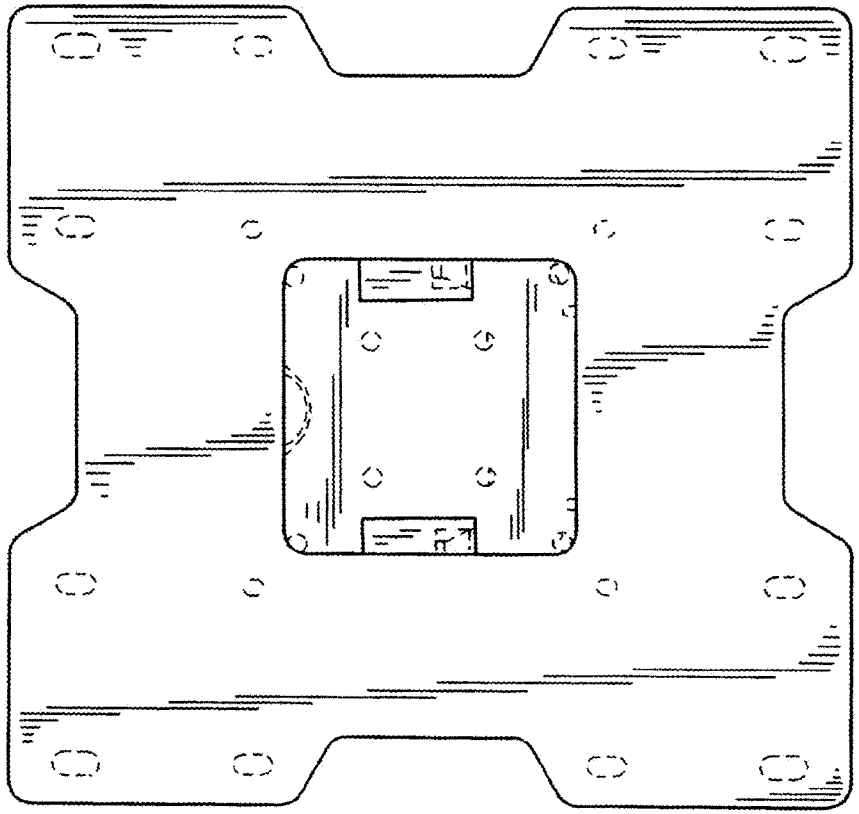
FIG. 16
NEW

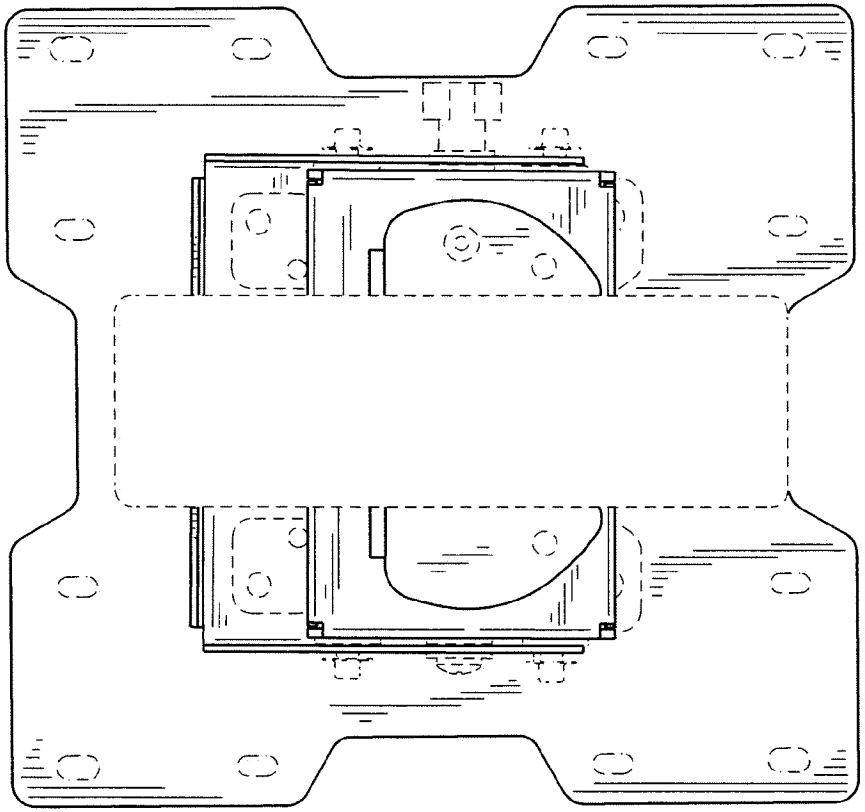
FIG. 17
NEW

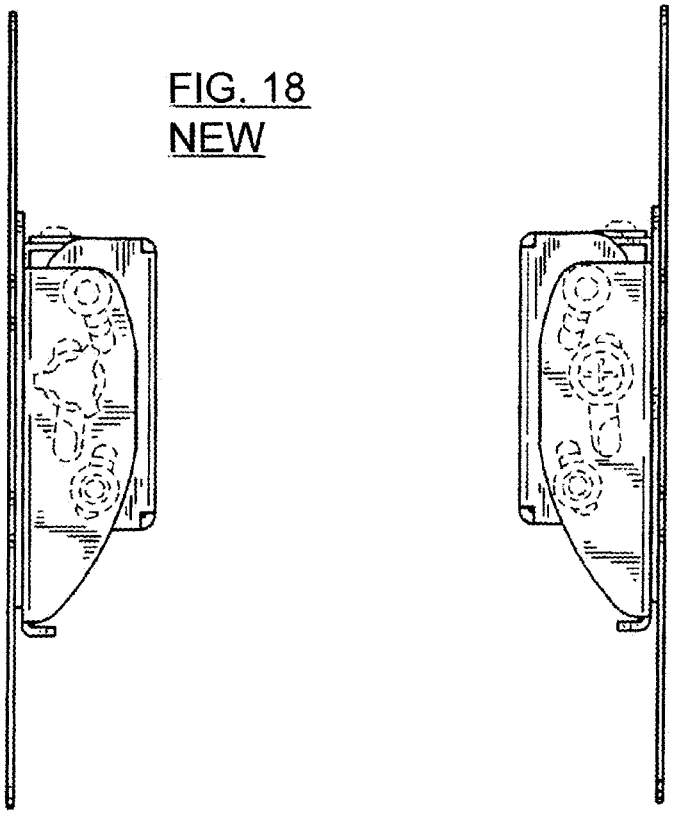
FIG. 18
NEW
FIG. 19
NEW
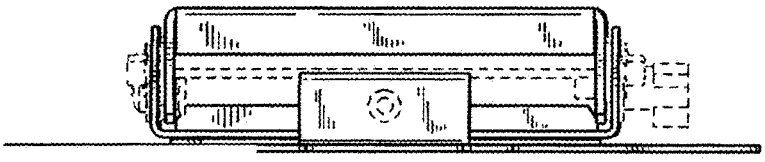
FIG. 20
NEW
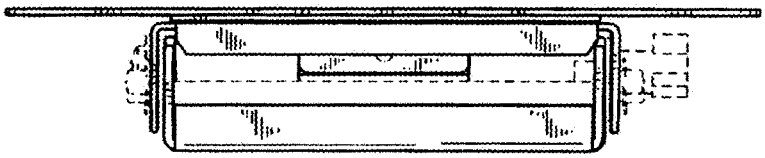
FIG. 21
NEW